(12) United States Patent
Casanova et al.

(10) Patent No.: US 9,133,868 B2
(45) Date of Patent: Sep. 15, 2015

(54) FASTENER WITH RADIAL LOADING

(71) Applicant: General Electric Company, Schenectady, NY (US)

(72) Inventors: Fernando Jorge Casanova, Simpsonville, SC (US); Rajesh Kumar, Bangalore (IN); Madhumita Roy, Bangalore (IN)

(73) Assignee: General Electric Company, Schenectady, NY (US)

( * ) Notice: Subject to any disclaimer, the term of this patent is extended or adjusted under 35 U.S.C. 154(b) by 57 days.

(21) Appl. No.: 13/863,441

(22) Filed: Apr. 16, 2013

(65) Prior Publication Data

US 2014/0308088 A1      Oct. 16, 2014

(51) Int. Cl.
*F16B 13/04* (2006.01)
*F16B 5/02* (2006.01)
*F16B 4/00* (2006.01)

(52) U.S. Cl.
CPC .. *F16B 5/02* (2013.01); *F16B 4/004* (2013.01)

(58) Field of Classification Search
USPC .......................................................... 411/24
See application file for complete search history.

(56) References Cited

U.S. PATENT DOCUMENTS

| 5,951,222 | A  | * | 9/1999  | Gosling ........................ 411/87 |
| 6,158,102 | A  |   | 12/2000 | Berry et al. |
| 6,190,127 | B1 |   | 2/2001  | Schmidt |
| 6,293,743 | B1 | * | 9/2001  | Ernst et al. ..................... 411/24 |
| 6,379,108 | B1 |   | 4/2002  | Schmidt |
| 6,438,837 | B1 |   | 8/2002  | Berry et al. |

\* cited by examiner

*Primary Examiner* — Gary Estremsky
(74) *Attorney, Agent, or Firm* — James W. Pemrick; Ernest G. Cusick; Frank A. Landgraff

(57) ABSTRACT

A fastener is provided including a bolt having at least one threaded end, a first sleeve configured to fit over the bolt, and a second sleeve configured to fit over the first sleeve. At least one nut is configured to cooperate with threads in the threaded ends of the bolt. The first and second sleeves are configured to impart an outwardly radial load when the nuts are tightened on the bolt.

7 Claims, 6 Drawing Sheets

A fastener with radial loading

FASTENER WITH RADIAL LOADING

BACKGROUND OF THE INVENTION

The apparatus described herein relates generally to fasteners. More specifically, the apparatus relates to a fastener having both radial and axial loading capability.

In a typical gas turbine, the turbine rotor is formed by stacking rotor wheels and spacers, the stacked plurality of wheels and spacers being bolted one to the other. Rabbeted joints are typically provided between the spacers and wheels.

During a standard transient, a rabbet joint between the wheel and the adjoining spacer or aft shaft may become unloaded due to a high rate of heating and/or cooling from a continuous run, resulting in a gap. The unloading may also be caused by thermal transients. An open or unloaded rabbet joint could cause the parts to move relative to each other and thereby cause the rotor to lose balance, possibly leading to high vibrations and the need for expensive and time-consuming rebalancing or rotor replacement. A rotor imbalance is operationally unacceptable, and it would be beneficial that such imbalance does not occur.

BRIEF DESCRIPTION OF THE INVENTION

In an aspect of the present invention, a fastener includes a bolt having at least one threaded end, a first sleeve configured to fit over the bolt and a second sleeve configured to fit over the first sleeve. At least one nut is configured to cooperate with threads in the at least one threaded end. The first and second sleeves are configured to impart an outwardly radial load when the at least one nut is tightened on the bolt.

In another aspect of the present invention, a fastener includes a bolt having at least one threaded end, a first sleeve configured to fit over the bolt, and a second sleeve configured to fit over the first sleeve. At least one nut is configured to cooperate with threads in the at least one threaded end. The first sleeve is located coaxially over the bolt and the second sleeve is located coaxially over the second sleeve. The first and the second sleeves are configured to impart an outwardly radial load when the at least one nut is tightened on the bolt.

In yet another aspect of the present invention, a fastener includes a bolt having at least one threaded end, a first sleeve configured to fit over the bolt, where the first sleeve has a substantially cylindrical inner diameter and a tapered outer diameter, and a second sleeve configured to fit over the first sleeve, where the second sleeve has a substantially cylindrical outer diameter and a tapered inner diameter. At least one nut is configured to cooperate with threads in the at least one threaded end. The first sleeve is located coaxially over the bolt and the second sleeve is located coaxially over the second sleeve. The first sleeve and the second sleeves are configured to impart an outwardly radial load when the at least one nut is tightened on the bolt.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
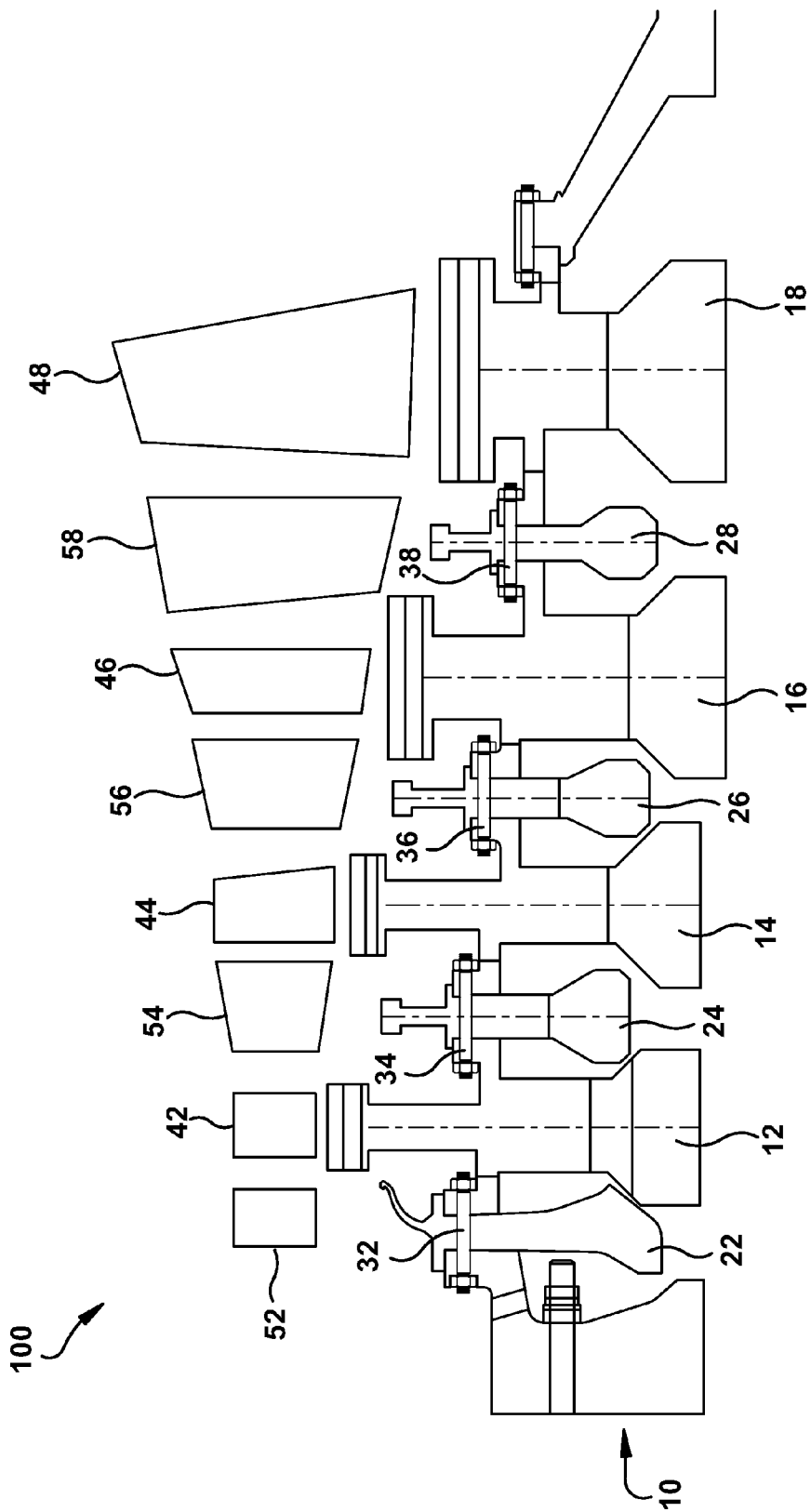
FIG. 1 illustrates a portion of a turbine including a turbine rotor.

Referring to FIG. 1, there is illustrated a portion of a turbine 100 (or turbomachine) including a turbine rotor, generally designated 10, comprised of stacked elements, for example, the rotor wheels 12, 14, 16 and 18 that form portions of a four-stage exemplary turbine rotor, with spacers 22, 24, 26 and 28 connected to the wheels 12, 14, 16 and 18 (each of which may include flanges for mounting/fastening hardware). It will be appreciated that the wheel and spacer elements are held together in the rotor by a plurality of elongated, circumferentially extending bolts (or fasteners) 32, 34, 36, 38. The wheels 12, 14, 16, 18 mount a plurality of circumferentially spaced turbine buckets 42, 44, 46, 48, respectively. Nozzles 52, 54, 56, 58 form stages with the buckets 42, 44, 46, 48, respectively. The wheels and spacers lie in axial registration one with the other, and rabbeted joints may be provided between the wheels and spacers. The rabbeted joints are maintained locked to one another throughout all ranges of operation of the turbine.

Thermal transients cause thermal mismatches between various elements of the rotor, and may occur during operation of the turbine, particularly during shutdown and turbine startup. The machine typically includes a continuously run bearing exhaust blower (not shown). During steady-state turbine operations, the temperature distribution among the various elements of the turbine lies within a predetermined range of thermal mismatch that would not deleteriously affect the operation of the turbine. During transient operations (i.e., shutdown and startup), however, thermal mismatches are significantly greater due to a high rate of cooling from the exhaust blower and must be accommodated. For example, the rabbeted joint between the aft shaft wheel and the wheel 18 of the final, e.g., fourth stage, has a significant thermal mismatch well beyond an acceptable thermal mismatch. Such a large thermal mismatch may cause an open or unloaded rabbet due to differing rates of thermal expansion and contraction, which condition could cause the elements to move relative to one another and thus cause the rotor to lose balance, leading to high vibrations and a requirement for costly rebalancing or rotor replacement. In addition, thermal transients may also cause other rabbeted joints to pry open and cause machine to shut down.

More particularly in steam cooled turbines, during shutdown, hot gases flowing through the hot gas path of the various turbine stages and the flow of steam through the bore tube cooling circuit assembly are terminated. Because the wheel 18 has a very large mass and has been heated to a high temperature during steady-state operation of the turbine, the wheel 18 will lose heat at a very slow rate in comparison with the heat loss in the aft shaft wheel, causing the large thermal mismatch at the rabbeted joint. However, the problem of rabbeted joints opening may occur in any type of turbine, with any cooling configuration.

Figure 2:
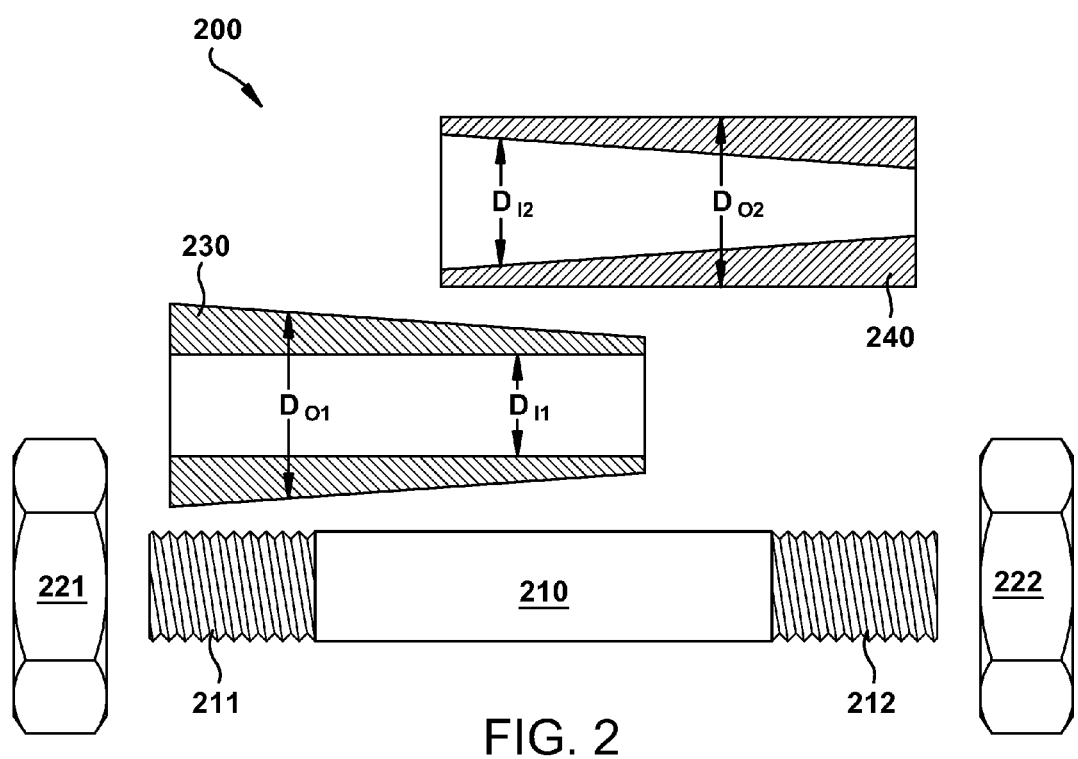
FIG. 2 illustrates an exploded view of a fastener, according to an aspect of the present invention.

FIG. 2 illustrates an exploded view of a fastener 200, according to an aspect of the present invention. The fastener 200 includes a bolt 210 having externally threaded ends 211, 212. Two nuts 221, 222, which are internally threaded, are configured to cooperate with threads in the threaded ends 211, 212. A first (or inner) sleeve 230 is configured to fit over the bolt 210. A second (or outer) sleeve 240 is configured to fit over the first sleeve 230. The first sleeve 230 and second sleeve 240 are configured to impart an outwardly radial load when the nuts 221, 222 are tightened on the bolt.

The first sleeve 230 may have a substantially cylindrical inner diameter DI1, and a tapered outer diameter DO1. Conversely, the second sleeve 240 may have a substantially cylindrical outer diameter DO2, and a tapered inner diameter DI2. The outer diameter DO2 may be sized to fit inside the bolt holes in the rotor wheels 12, 14, 16, 18 and spacers 20, 22, 24, 26, 28.

Figure 3:
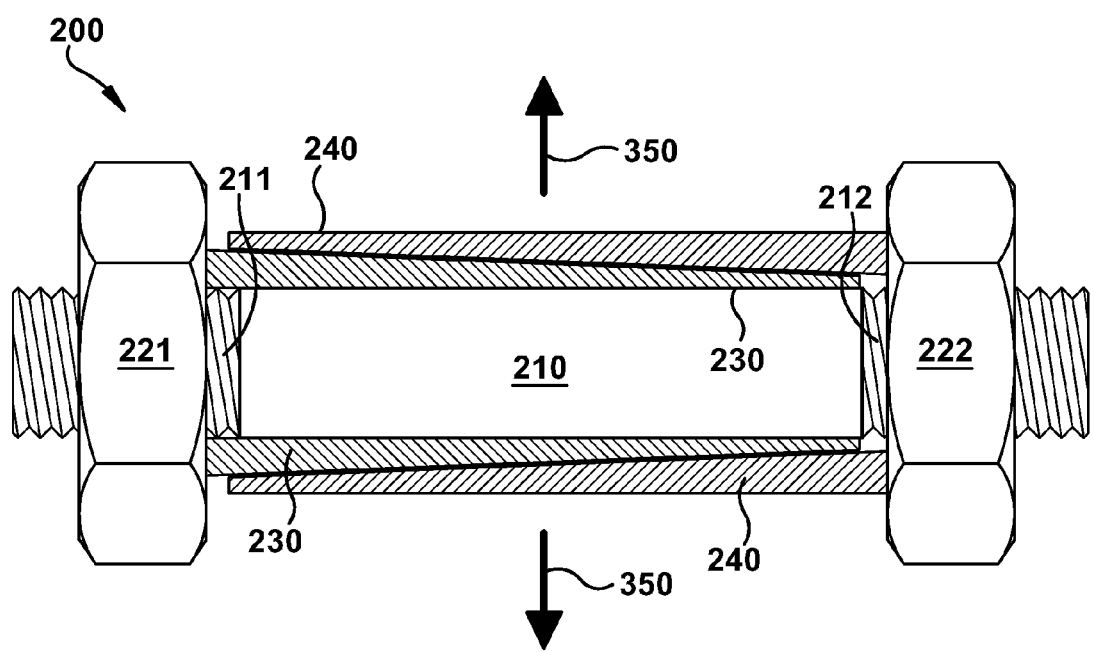
FIG. 3 illustrates an assembled fastener, according to an aspect of the present invention.

FIG. 3 illustrates an assembled fastener 200, according to an aspect of the present invention. In use, the first sleeve 230 may be placed over the bolt 210, and then the second sleeve 240 may be placed, at least partially, over the first sleeve 230. As the nuts 221, 222 are tightened and travel in (or axially) along the threads 211, 212, the first sleeve 230 and second sleeve 240 are pushed toward each other and progressively overlap each other. This overlapping (or axial) movement creates a radial load outwardly (illustrated by arrows 350) against the inner surfaces of the bolt holes.

Figure 4:
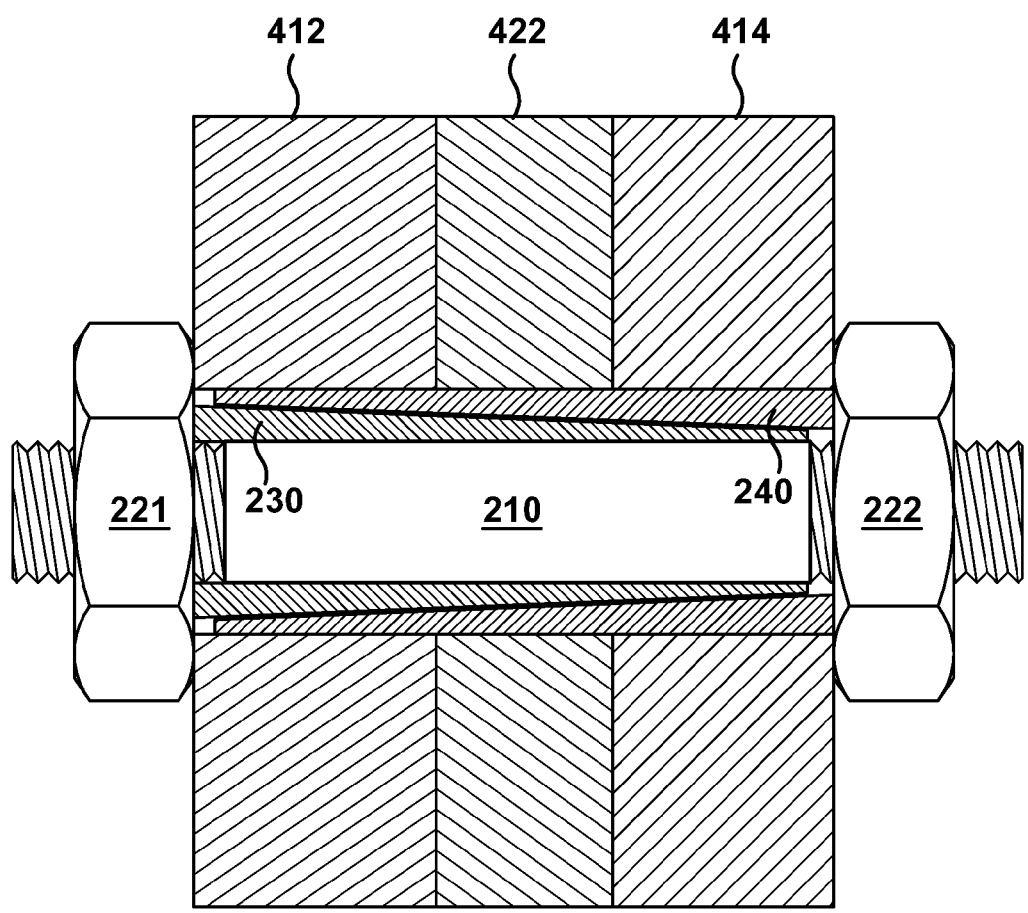
FIG. 4 illustrates an assembled fastener 200 installed in a bolt hole; according to an aspect of the present invention.

FIG. 4 illustrates an assembled fastener 200 installed in a bolt hole, where the fastener 200 is securing multiple stages in a turbomachine according to an aspect of the present invention. The fastener 200 is securing together rotor wheels 412, 414 and spacer 422 (or the flanges of the turbine wheels and spacers). In addition, the fastener 200 could be used in any application where a radial load is desired, including, but not limited to turbomachines, turbines, and compressors. In turbine applications, the bolt holes are circumferentially arranged along the wheels and spacers, so multiple fasteners are used to secure the stages. The radial loading provided on the inner surfaces of the bolt holes prevents or at least reduces the possibility that the rotor wheels and spacers will misalign radially, thereby unbalancing the rotor or creating undesired leakage paths. In addition, the rabbet configuration could possibly be avoided, as the fastener 200 now provides the required radial loads and alignment to secure the stages.

Figure 5:
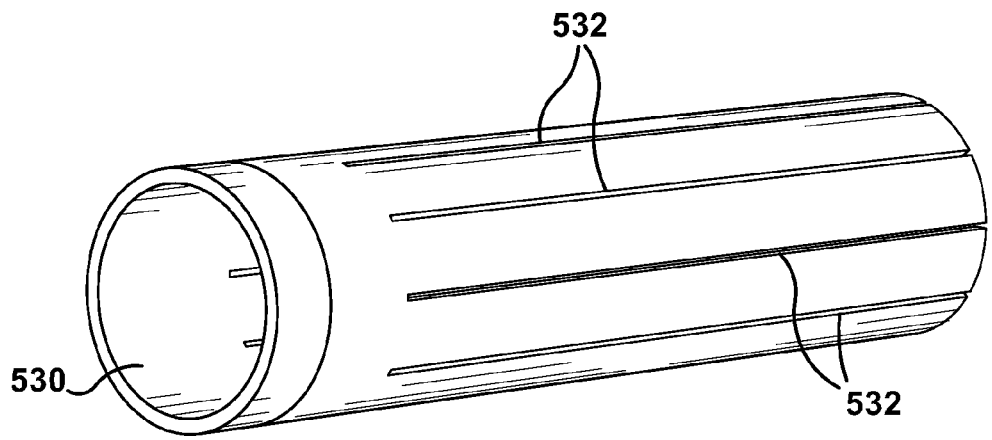
FIG. 5 illustrates a perspective view of a first sleeve, according to an aspect of the present invention.

FIG. 5 illustrates a perspective view of a first sleeve 530, according to an aspect of the present invention. The first sleeve 530 includes a plurality of axially oriented slots 532 spaced circumferentially around the first sleeve 530. The slots 532 allow the first sleeve 530 to contract or expand around the bolt 210.

Figure 6:
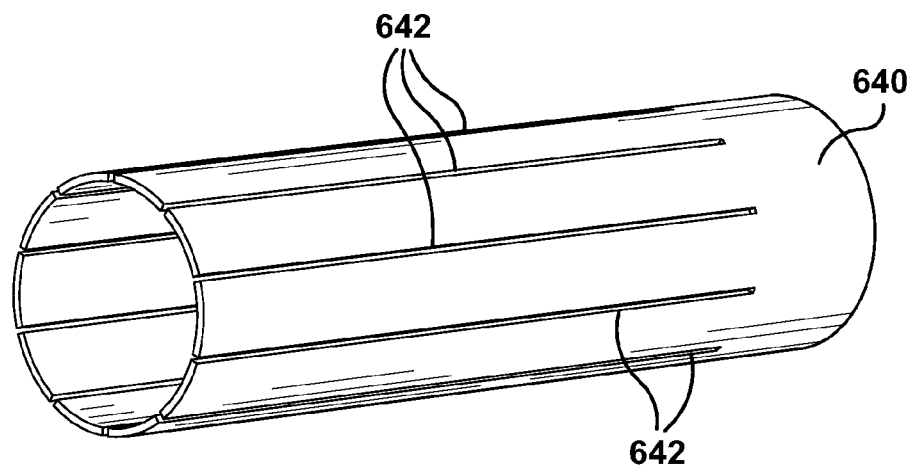
FIG. 6 illustrates a perspective view of a second sleeve, according to an aspect of the present invention.

FIG. 6 illustrates a perspective view of a second sleeve 640, according to an aspect of the present invention. The second sleeve 640 includes a plurality of axially oriented slots 642 spaced circumferentially around the second sleeve 640. The slots 642 allow the second sleeve 640 to contract or expand around the first sleeve 530. It is to be understood that sleeves 530 and 640 could be used together or separately. For example, first sleeve 230 could be used with second sleeve 640, or first sleeve 530 could be used with second sleeve 240. The non-slotted portions of the sleeves may be used for axial loads transmitted by the nuts.

Figure 7:
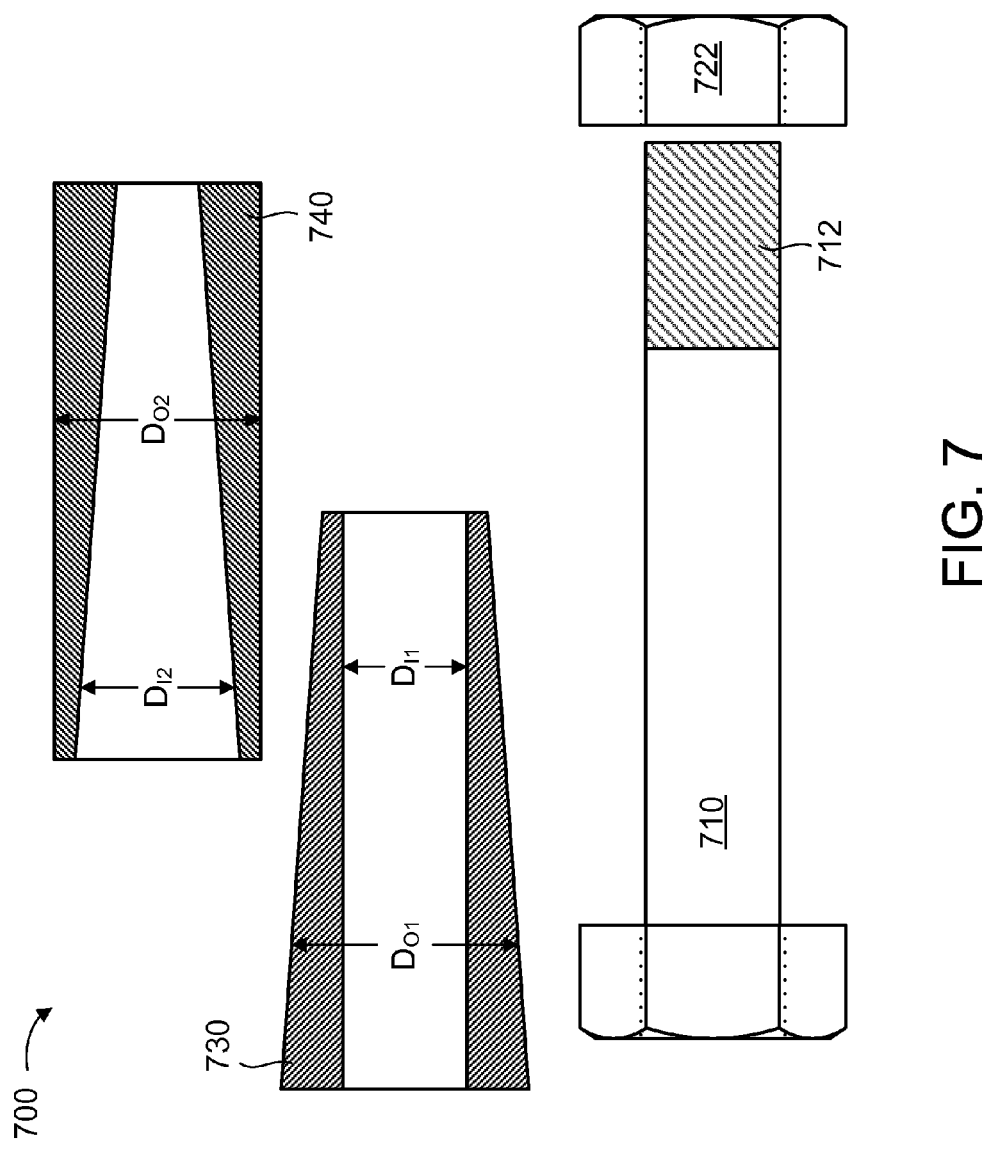
FIG. 7 illustrates an exploded view of a fastener, according to an aspect of the present invention.

FIG. 7 illustrates an exploded view of a fastener 700, according to an aspect of the present invention. The fastener 700 includes a bolt 710 having one externally threaded end 712. A nut 722, which is internally threaded, is configured to cooperate with threads in the threaded end 712. A first (or inner) sleeve 730 is configured to fit over the bolt 710. A second (or outer) sleeve 740 is configured to fit over the first sleeve 730. The first sleeve 730 and second sleeve 740 are configured to impart an outwardly radial load when the nut 722 is tightened on the bolt 710. The first sleeve 730 has a substantially cylindrical inner diameter DI1, and a tapered outer diameter DO1. Conversely, the second sleeve 740 may have a substantially cylindrical outer diameter DO2, and a tapered inner diameter DI2. The outer diameter DO2 may be sized to fit inside the bolt holes in the rotor wheels 12, 14, 16, 18 and spacers 22, 24, 26, 28.

The fasteners 200, 700, according to aspects of the present invention, provide a number of advantages. The fasteners provide centering and additional torque carrying capability. The rotor wheels and spacers will be essentially self-centering with the fastener. Assembly time is reduced, as the need for heating (or cooling) wheels is eliminated due to the elimination of the need for rabbets. Line reaming multiple flanges is no longer required. Fasteners 200, 700 also greatly facilitate rotor unstacking and enables this procedure to be done in the field or at the site of use.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A fastener configured for use in a turbomachine, the fastener comprising:
   a bolt having at least one threaded end;
   a first sleeve configured to fit over the bolt, the first sleeve having a substantially cylindrical inner diameter and a tapered outer diameter;
   a second sleeve configured to fit over the first sleeve, the second sleeve having a substantially cylindrical outer diameter and a tapered inner diameter, and the second sleeve having a plurality of axially oriented slots, the plurality of axially oriented slots allowing the second sleeve to contract or expand around the first sleeve;

at least one nut configured to cooperate with threads in the at least one threaded end; and wherein, the first sleeve and second sleeve are configured to impart an outwardly radial load when the at least one nut is tightened on the bolt, and wherein the fastener is used to connect a plurality of rotor wheels and spacers in the turbomachine.

2. The fastener of claim 1, wherein the bolt has two threaded ends.

3. The fastener of claim 1, wherein the first sleeve comprises a plurality of axially oriented slots, the plurality of axially oriented slots allowing the first sleeve to contract or expand around the bolt.

4. A fastener configured for use in a turbomachine, the fastener comprising:

a bolt having two threaded ends, and two nuts are configured to cooperate with the two threaded ends;

a first sleeve configured to fit over the bolt, the first sleeve having a substantially cylindrical inner diameter and a tapered outer diameter, the first sleeve having a plurality of axially oriented slots, the plurality of axially oriented slots allowing the first sleeve to contract or expand around the bolt;

a second sleeve configured to fit over the first sleeve, the second sleeve having a substantially cylindrical outer diameter and a tapered inner diameter, the second sleeve having a plurality of axially oriented slots, the plurality of axially oriented slots allowing the second sleeve to contract or expand around the first sleeve;

wherein, the first sleeve is located coaxially over the bolt and the second sleeve is located coaxially over the first sleeve, the first sleeve and the second sleeve are configured to impart an outwardly radial load when the at least one nut is tightened on the bolt, and wherein the fastener is used to connect a plurality of rotor wheels and spacers, and the outwardly radial load is applied to an inner diameter of through holes in the rotor wheels and spacers.

5. A fastener comprising:

a bolt having at least one threaded end;

a first sleeve configured to fit over the bolt, the first sleeve having a substantially cylindrical inner diameter and a tapered outer diameter;

a second sleeve configured to fit over the first sleeve, the second sleeve having a substantially cylindrical outer diameter and a tapered inner diameter, the second sleeve having a plurality of axially oriented slots, the plurality of axially oriented slots allowing the second sleeve to contract or expand around the first sleeve;

at least one nut configured to cooperate with threads in the at least one threaded end; and wherein, the first sleeve is located coaxially over the bolt and the second sleeve is located coaxially over the first sleeve, the first sleeve and the second sleeve are configured to impart an outwardly radial load when the at least one nut is tightened on the bolt.

6. The fastener of claim 5, wherein the bolt has two threaded ends and the fastener has two nuts.

7. The fastener of claim 5, wherein the first sleeve comprises a plurality of axially oriented slots, the plurality of axially oriented slots allowing the first sleeve to contract or expand around the bolt.

* * * * *